(12) United States Patent
Gupta et al.

(10) Patent No.: US 8,831,328 B2
(45) Date of Patent: Sep. 9, 2014

(54) METHOD AND SYSTEM FOR SEGMENTING A BRAIN IMAGE

(75) Inventors: Varsha Gupta, Singapore (SG); Wieslaw L. Nowinski, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 194 days.

(21) Appl. No.: 13/379,649

(22) PCT Filed: Jun. 17, 2010

(86) PCT No.: PCT/SG2010/000228
§ 371 (c)(1),
(2), (4) Date: Dec. 20, 2011

(87) PCT Pub. No.: WO2010/151229
PCT Pub. Date: Dec. 29, 2010

(65) Prior Publication Data
US 2012/0099779 A1    Apr. 26, 2012

(30) Foreign Application Priority Data
Jun. 23, 2009   (SG) ............................... 200904356-3

(51) Int. Cl.
*G06K 9/00* (2006.01)
*G06T 7/00* (2006.01)
*G06K 9/38* (2006.01)

(52) U.S. Cl.
CPC ............. *G06K 9/38* (2013.01); *G06T 7/0081* (2013.01); G06T 2207/30016 (2013.01); G06T 2207/20148 (2013.01); G06T 2207/10072 (2013.01); *G06T 7/0087* (2013.01); G06T 2207/10081 (2013.01)
USPC ........................................... 382/133

(58) Field of Classification Search
None
See application file for complete search history.

(56) References Cited

U.S. PATENT DOCUMENTS 6,430,430 B1 * 8/2002 Gosche ..................... 600/410
6,658,080 B1   12/2003 Poole et al.
7,428,323 B2   9/2008 Hillman

FOREIGN PATENT DOCUMENTS

WO   WO 2004/077359 A1   9/2004
WO   WO 2006/114003 A1   11/2006

(Continued)

OTHER PUBLICATIONS

Lemieux, Louis, et al. "Automatic segmentation of the brain and intracranial cerebrospinal fluid in T1-weighted volume MRI scans of the head, and its application to serial cerebral and intracranial volumetry." Magnetic resonance in medicine 49.5 (2003): 872-884.*

(Continued)

*Primary Examiner* — Nirav G Patel
(74) *Attorney, Agent, or Firm* — Blakely, Sokoloff, Taylor & Zafman LLP

(57) ABSTRACT

A method is proposed for segmenting a brain image into a CSF region, a WM region and a GM region. An upper limit for the intensity values of a CSF region in the image is estimated such that the points of the image having an intensity less than this upper limit include a subset of the points which form a spatially connected group and which have a peaked intensity distribution. In other words, the invention exploits both the expected spatial distribution and expected intensity distribution of the CSF region. This makes it possible for the method to provide reliable discrimination of the CSF region even in CT images with poor image quality. Various methods are proposed for using the upper limit, and for improving the segmentation accuracy.

28 Claims, 13 Drawing Sheets

(56) References Cited

FOREIGN PATENT DOCUMENTS

WO     WO 2006/121410 A1     11/2006
WO     WO 2008/069762 A1     6/2008

OTHER PUBLICATIONS

PCT International Search Report for PCT Counterpart Application No. PCT/SG2010/000228, 4 pgs., (Sep. 9, 2010).

PCT Written Opinion of the International Searching Authority for PCT Counterpart Application No. PCT/SG2010/000228, 8 pgs., (Sep. 9, 2010).

PCT International Preliminary Report on Patentability (Chapter II of the Patent Cooperation Treaty) for PCT Counterpart Application No. PCT/SG2010/000228, 11 pgs., (Feb. 7, 2011).

Mohammadreza Heydarian, et al., "Optimizing the Level Set Algorithm for Detecting Object Edges in MR and CT Images", IEEE Transactions on Nuclear Science, vol. 56, No. 1, pp. 156-166, (Feb. 2009).

Yongjie Hu, et al, "Automatic Segmentation of Brain CT Image Based on Multiplicate Features and Decision Tree", International Conference on Communications, Circuits and Systems, pp. 837-840, (Jul. 11-13, 2007).

Tong Hau Lee, et al., "Segmentation of CT Brain Images Using K-means and EM Clustering", Fifth International Conference on Computer Graphics, Imaging and Visualization, pp. 339-344, (Aug. 26-28, 2008).

Ujjwal Maulik, "Medical Image Segmentation Using Genetic Algorithms", IEEE Transactions on Information Technology in Biomedicine, vol. 13, No. 2, pp. 166-173, (Mar. 2009).

Guoyu Qian, et al., "Extraction of the Brain from CT Head Scans Based on Domain Knowledge", AIP Conference Proceedings, vol. 952, pp. 76-85, (2007).

M. T. Torbey, et al., "Quantitative Analysis of the Loss of Distinction Between Gray and White Matter in Comatose Patients After Cardiac Arrest", Stroke, vol. 31, pp. 2163-2167, (Sep. 2000).

Paul L. Rosin, "Unimodal Thresholding," Pattern Recognition, vol. 34, No, 11, pp. 2083-2096, Nov. 1, 2001.

Extended European Search Report for EP Counterpart Patent Application No. 10792425.0-1906, 9 pgs. Nov. 10, 2013.

D.L. Pham, et al., "Current Methods in Medical Image Segmentation", Annual Review of Biomedical Engineering, vol. 2, pp. 315-337, (2000).

H.E. Cline, et al., "Three-Dimensional Segmentation of MR Images of the Head using Probability and Connectivity", J. Comput. Assist. Tomogr., vol. 14, Issue 6, pp. 1037-1045, (Nov./Dec. 1990) and PubMed Abstract.

Liqun Wang, et al., "Correction for Variations in MRI Scanner Sensitivity in Brain Studies with Histogram Matching", Magnetic Resonance in Medicine, vol. 39, pp. 322-327, (1998).

S.P. Choi, et al., "The density ratio of grey to white matter on computed tomography as an early predictor of vegetative state or death after cardiac arrest," Emerg Med J, vol. 25, No. 10, pp. 666-669 (2008).

James M. DeLeo, et al., "Computer-Assisted Categorization of Brain Computerized Tomography Pixels into Cerebrospinal Fluid, White Matter, and Gray Matter," Computers and Biomedical Research, vol. 18, Iss. 1, pp. 79-88 (Feb. 1985).

H. Hacker, et al., "The Calculation of CSF Spaces in CT," Neuroradiology, vol. 16, Iss. 1, pp. 190-192 (Dec. 15, 1978).

Ruzica Maksimovic, et al., "Computed tomography image analyzer: 3D reconstruction and segmentation applying active colour models — 'snakes'," International Journal of Medical Informatics, vols. 58-59, pp. 29-37 (Sep. 2000).

Urs E. Ruttiman, et al., "Fully Automated Segmentation of Cerebrospinal Fluid in Computed Tomography," Psychiatry Research: Nueroimaging, vol. 50, Iss. 2, pp. 101-119 (Jun. 1993).

Wieslaw L. Nowinski, et al., "Use of normative distribution of gray to white matter ratio in orthogonal planes in human brain studies and computer-assisted neuroradiology," Int J CARS, vol. 6, Iss. 4, pp. 489-505 (Jul. 2011).

P.R. Bevington, "Data Reduction and Error Analysis for the Physical Science," pp. Title page, Table of Contents, Preface, About the Authors, and 267-274 (2003).

John Mandel, "The Statistical analysis of experimental data," Dover Publications, pgs. Cover page, preface, table of contents, introduction, and 58-77 (1984).

\* cited by examiner (a)

(d)

(b)

(e)

(c)

(f)

(a) (b)

(a)

(b)

METHOD AND SYSTEM FOR SEGMENTING A BRAIN IMAGE

CROSS-REFERENCE TO RELATED APPLICATIONS

This patent application is a U.S. National Phase application under 35 U.S.C. §371 of International Application No. PCT/SG2010/000228, filed Jun. 17, 2010, entitled A METHOD AND SYSTEM FOR SEGMENTING A BRAIN IMAGE, which claims priority to Singapore Patent Application No. 200904356-3, filed Jun. 23, 2009.

FIELD OF THE INVENTION

The present invention relates to a method and system for segmenting a brain image. The segmented brain image may in turn be used for identifying stroke in a patient.

BACKGROUND OF THE INVENTION

Accurate gray and white matter segmentation of CT (Computer Tomography) images is important in the estimation of cerebrospinal fluid, white and gray matter regions, which in turn is useful in the prediction of clinical outcomes. For example, when identifying stroke from CT scan images, it is very important that the cerebrospinal fluid (CSF) and the white matter (WM) intensity thresholds are accurately identified. This is because, the infract intensity range is close to the intensity ranges of the hypo-dense WM (i.e. lower values of intensity amongst WM intensities) and the hyper-dense CSF (i.e. higher values of intensity amongst CSF intensities).

Unfortunately, inherent instrumentation effects in CT images often affect the image quality of the CT images and increase their variability. In addition, intensity variations in CT scan images can occur due to the following reasons: different machine parameters, beam hardening artifacts and signal attenuations due to different skull thickness. Further, due to infarction, there is usually a loss of contrast between gray and white matter in CT images [Choi et al. 2008, Torbey et al 2000]. This impacts the segmentation accuracy. Moreover, the contrast between gray matter (GM) and white matter (WM) is very low, hence increasing the difficulty in segmenting the CT images. Thus, simply using hard coded threshold values to segment CT images can lead to substantial errors.

Several segmentation techniques have been previously proposed. Lee et al. 2008 proposed an approach of segmenting CT brain images using K-means and EM (Expectation-Maximization) clustering. However, the approach in Lee et al. 2008 is limited to the segmentation of the CSF (Cerebrospinal fluid), skull, parenchyma and calcification regions, and does not consider the segmentation of gray and white matter. Hu et al 2007 proposed an automatic segmentation method based on pattern recognition, fuzzy theory, anatomy, fractal dimensions etc. However, the method in Hu et al 2007 uses arbitrary parameters and has no quantitative measure of performance. Furthermore, in general, a shape or texture based analysis can perform well only when the image quality is good. Qian et al. 2007 proposed a method of extracting the brain from CT head scans based on domain knowledge. However, the method in Qian et al. 2007 is limited to skull removal and/or head extractions. Furthermore, Hacker and Artmann, 1976 proposed a ROI (Region of Interest) based CSF estimation whereby the intensity value of CSF is estimated to be approximately 20 HU.

Many of the segmentation algorithms are based on the adjustment of several parameters [Heydarian et al 2009] and this requires experience and expertise. Moreover, such segmentation algorithms have their limitations when used on an organ composed of different tissue types (e.g. the brain). In addition, although genetic algorithms have been proposed for segmentation purposes, there are often issues with the convergence criteria and the huge computation time of these algorithms [Maulik 2009]. Also, most commercially available algorithms are not developed with CT images in mind due to the poor image quality of CT images. For example, some algorithms (such as the SPM5 which works for MR images only) require registration to an initial template if they are to be used for CT images.

SUMMARY OF THE INVENTION

The present invention aims to provide a new and useful method and system for identifying a CSF region in a brain image. This may be part of a process of segmenting the brain image into a CSF region, a WM region and a GM region.

In general terms, the present invention proposes, as part of a method for segmenting a brain image composed of intensity values at multiple points, estimating an upper limit for the intensity values of a CSF region in the image, by selecting a value for this upper limit such that the points of the image having an intensity value less than this upper limit and greater than zero include a subset of the points which form a spatially connected group of maximum size and which have a peaked intensity distribution. In other words, the invention exploits both the expected spatial distribution and expected intensity distribution of the CSF region. This makes it possible for the method to provide reliable discrimination of the CSF region even in CT images with poor image quality.

The upper limit value is preferably varied such that the intensity distribution of the corresponding maximum size connected group of points gives rise to an optimum value of a predetermined significance criterion. In particular, the upper limit value is varied such as to maximize a predefined significance parameter.

The upper limit estimated in this way may be further refined in further process steps, for example before it is used for segmentation of the CSF region of the image.

Points in the image having intensity values above the estimated upper limit may be used in a process to obtain WM and GM regions.

The method may be performed automatically (which is here used to mean that, although human interaction may initiate the algorithm, human interaction is not required while the algorithm is carried out). The algorithm may alternatively be performed semi-automatically (in which case there is human interaction with the computer during the processing). In preferred embodiments, the algorithm is fully automatic, and there are no parameters to be set or adjusted by the user. No skull stripping is required, and there is no registration or machine learning.

The invention may alternatively be expressed as a computer system for performing such a method. This computer system may be integrated with a device for capturing brain images. The invention may also be expressed as a computer program product, such as one recorded on a tangible computer medium, containing program instructions operable by a computer system to perform the steps of the method.

BRIEF DESCRIPTION OF THE FIGURES

An embodiment of the invention will now be illustrated for the sake of example only with reference to the following drawings, in which.

DETAILED DESCRIPTION OF THE EMBODIMENTS

Figure 1:
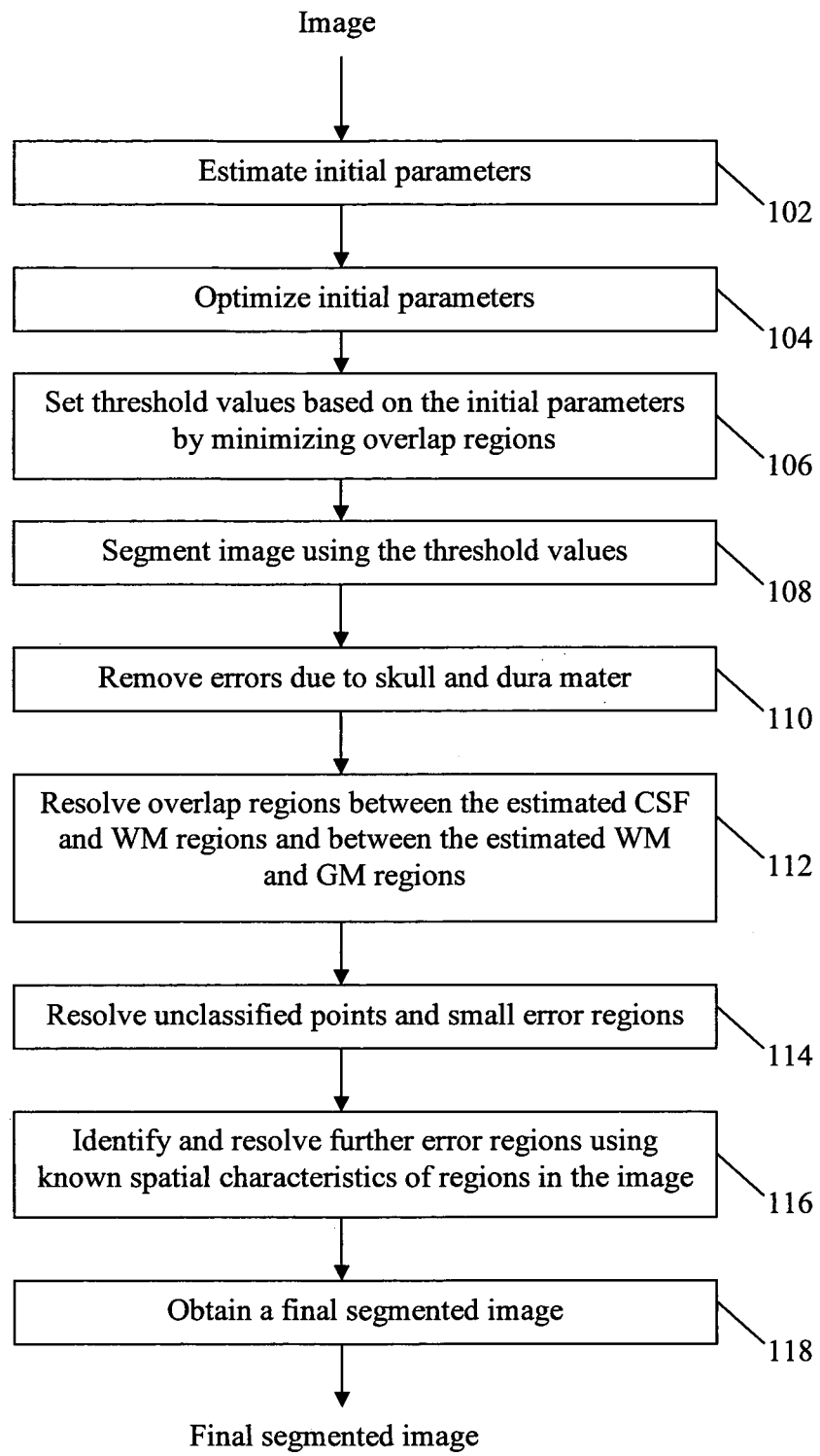
FIG. 1 illustrates a flow diagram of a method for segmenting a brain image in an embodiment of the present invention.

Referring to FIG. 1, the steps are illustrated of a method 100 which is an embodiment of the present invention, and which segments a brain image into a CSF region, a WM region and a GM region. The brain image comprises intensity values at respective points and is a 3D image since method 100 exploits the fact that in three-dimension and within a parenchyma region in a brain, the ventricle region is the largest connected component. The intensity values may be in Hounsfield units, or may be converted into Hounsfield units as a first step of the method. The points may be voxels of the 3D image.

The brain image which is the input to method 100 may be a CT brain image. However, the brain image may be of a different image modality (e.g. an MRI image). In step 102, a set of initial parameters are estimated and in step 104, some of the estimated initial parameters are optimized. Next, in step 106, threshold values are set based on the estimated initial parameters and in step 108, the image is segmented into estimated CSF, WM and GM regions using the threshold values. In step 110, errors due to skull and dura matter are removed from the estimated regions. In steps 112 and 114, overlap regions between the estimated regions, unclassified points and small error regions are resolved. Next, in step 116, further error regions are identified and resolved using known spatial characteristics of regions in the image. Finally, in step 118, a final segmented image is obtained. These steps will now be described in more detail.

Step 102: Estimate Initial Parameters

In step 102, an upper limit for the intensity values in the CSF region is first estimated. Initial parameters are then estimated using the estimated upper limit (i.e. CSFU). The initial parameters are the means and standard deviations of the intensity values in the CSF, WM and GM regions.

Figure 2:
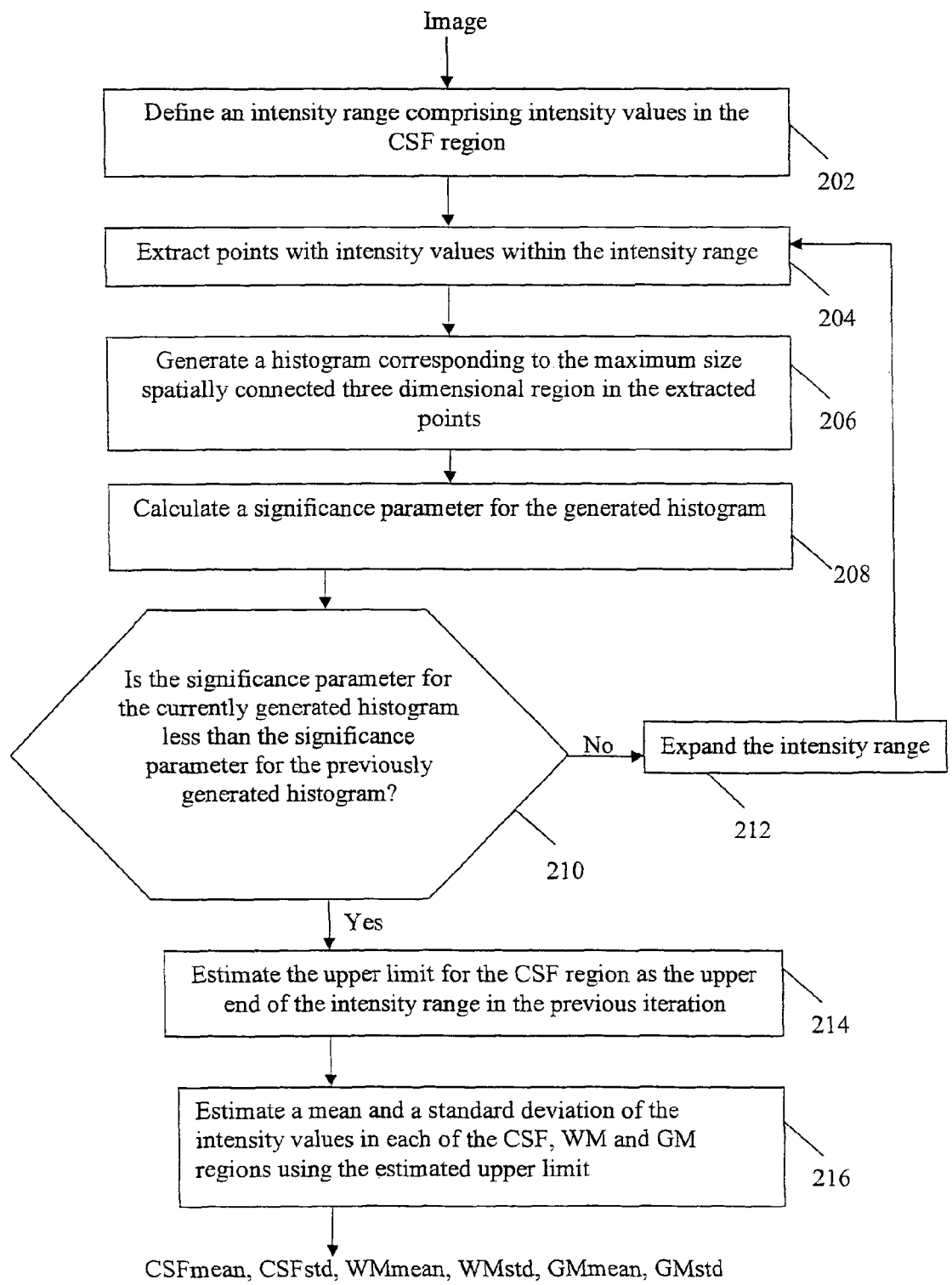
FIG. 2 illustrates a flow diagram of a step for estimating initial parameters in the method of FIG. 1.

FIG. 2 illustrates the sub-steps of step 102.

In sub-step 202, an intensity range [0, X] comprising intensity values in the CSF region is first defined. X is an upper end of the intensity range and is variable. In one example, X is initially set as 10 so that for most of the acquired CT images, there is a high possibility that the intensity range lies within the range of intensity values in the CSF region of the image [Hacker and Artmann, 1976].

In sub-step 204, points with intensity values within the intensity range (as defined in sub-step 202) are extracted from the image. In one example, a smoothing function is then applied on these extracted points. This smoothing is advantageous as it removes spatial error regions in the parenchyma. It is preferable to use an optimum smoothing function so that the shapes of the boundary regions can be preserved while smoothing the core regions in the image. For example, a median filter of window size [5,5] may be used on an image with a resolution of 1 mm×1 mm to achieve optimum results.

In sub-step 206, a histogram corresponding to the maximum size spatially connected three dimensional region in the extracted points from sub-step 204 is generated. First, we obtain a subset of the extracted points. This subset comprises those extracted points which constitute the largest spatially connected region in the image. This largest spatially connected region represents a three-dimensional core of ventricular regions in the image. Note that conceivably there may be cases in which all the extracted points are connected to each other, and in this case all those points would be in the "subset"; i.e. the term "subset" is used in this document to embrace the set of all the extracted points. Next, a histogram of the intensity values of the subset of the extracted points is generated. In one example, a smoothing function is then applied to the generated histogram. The histogram is a plot where the x-axis indicates the intensity values of the points of the connected region, and the y-axis shows the frequencies with which these intensity values occur within the connected region.

Next, the method includes at least one iteration of (i) expanding the intensity range, and (ii) repeating sub-steps 202-206. The iterations continue until a difference between a currently generated histogram and a previously generated histogram indicates that the intensity range has been raised so high that it has begun to include a significant amount of the WM region. This is elaborated as follows.

In sub-step 208, a significance parameter is calculated for the generated histogram as $(H_{max}-H_{end})/\sqrt{(H_{max}-H_{end})}$ whereby Hmax is a maximum frequency (or voxel count) in the generated histogram and Hend is a frequency with which the maximum intensity value (i.e. the last bin) in the generated histogram occurs [Mandel 1984, Bevington 1969].

Figure 3:
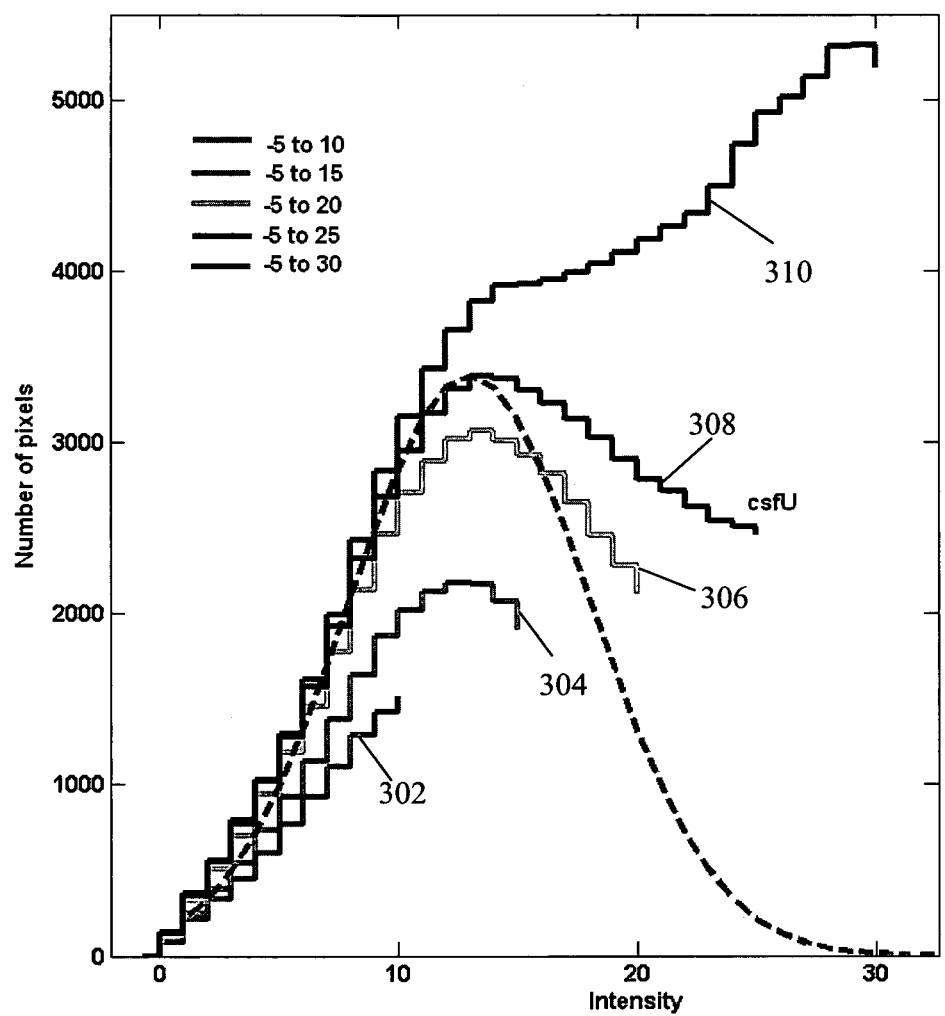
FIG. 3 illustrates example histograms generated for the largest spatially connected component in different intensity ranges.

The difference between Hend and Hmax in the generated histogram is smaller when the upper end of the intensity range is very large or very small. Hence, the significance parameter is maximum when the upper end of the intensity range is at a critical intermediate value. This is because when the upper end of the intensity range is small, only a small portion of the CSF region is extracted and this gives rise to a monotonically increasing histogram. As the upper end of the intensity range increases, a larger portion of the CSF region is extracted and the generated histogram is no longer a monotonically increasing function since the CSF region actually has a distribution of intensity values including a peak. As the upper end of the intensity range increases, the extracted portion grows to form full ventricles in the image. A further increase in the upper end of the intensity range results in the extraction of hypo-dense points in the WM region. This "washes off" the peak of the generated histogram and the generated histogram tends towards a monotonically increasing curve again to form a whole parenchyma peak e.g. a continuous CSF, WM and GM histogram. Note it is possible that the monotonically feature may not always be visible. However, the steepness of the histogram slope after "Hmax" is always expected to decrease as a significant number of WM voxels start contributing to the 3D spatially connected region. FIG. 3 illustrates example histograms generated for the largest spatially connected component in different intensity ranges. The curves 302, 304, 306, 308 and 310 are respectively the example histograms generated for the intensity ranges [−5 to 10], [−5 to 15], [−5 to 20], [−5 to 25] and [−5 to 30].

As mentioned above, as the intensity range increases, a histogram with a peak will eventually be generated. The pre-peak slope region of the histogram is mainly defined by the CSF intensity values. To estimate an upper limit for the intensity values in the CSF region, method 100 relies on the "flattening" of the post-peak slope of the histogram due to the contribution of WM intensity values in the post-peak slope region (as shown in the following sub-steps). Note that the histogram generated for the initial intensity range (defined in sub-step 202) need not be a monotonous function.

In sub-step 210, a check is performed to determine if the significance parameter for the currently generated histogram is less than the significance parameter for the previously generated histogram.

If the result of the check in sub-step 210 is negative, sub-step 212 is performed in which the intensity range is expanded by increasing the upper end of the intensity range and sub-steps 204-210 are repeated.

On the other hand, if the result of the check in sub-step 210 is positive, it is determined that the difference between the currently generated histogram and the previously generated histogram indicates that the significance parameter has fallen, i.e. the connected component is starting to include significant numbers of points which are actually in the WM region. In this case, sub-step 214 is performed in which the upper limit for the intensity values in the CSF region is estimated as the upper end of the intensity range in the previous iteration. This estimated upper limit (i.e. CSFU) is used in the following steps for segmenting the image.

In sub-step 216, a mean and a standard deviation of the intensity values in each of the CSF, WM and GM regions (i.e. (CSFmean, CSFstd), (WMmean, WMstd), and (GMmean, GMstd) respectively) are estimated using CSFU as follows.

CSFmean is estimated as an intensity value with a maximum frequency (i.e. Hmax) in the histogram generated when estimating the upper limit for the intensity values in the CSF region. CSFstd is estimated as a function of the intensity value at the left-side half width half maximum (HWHM) of the same histogram. The "left-side" HWHM means the HWHM in the histogram which is lower than Hmax. In one example, the CSFstd is estimated using the equation $I_{HWHM}=1.17*CSFstd$ whereby $I_{HWHM}$ is the intensity value at the left-side HWHM of the histogram.

To estimate WMmean, GMmean, WMstd and GMstd, a first range of intensity values is defined wherein the lower end of this first range is the estimated upper limit, CSFU. In one example, this first range is [CSFU, CSFU+L] whereby L is set as 50. From experimentation, it was found that with L set as 50, the first range comprises intensity values of most forms of parenchyma regions in different types of data (i.e. different image modalities). A first set of points with intensity values within this first range are then identified within the image and a histogram is formed using this first set of points. The histogram is a plot where the x-axis indicates the intensity values of the first set of points, and the y-axis shows the frequencies with which these intensity values occur.

WMmean, GMmean, WMstd and GMstd are then derived using the histogram. First, an intensity boundary to partition points in the image into an estimated WM region and an estimated GM region (or in other words, an estimated upper limit for the intensity values in the WM region, WMU) is obtained. In one example, the intensity boundary is defined as an intensity value with a maximum frequency in the formed histogram. Second and third ranges of values are defined to meet at the value WMU. In one example, the widths of the second and third ranges are equal, and the second and third ranges are [CSFU, WMU] and [WMU, WMU+(WMU−CSFU)] respectively. Next, a second and third set of points with intensity values lying within the second and third ranges respectively are identified in the image. The second set of points is taken as an estimated WM region, and the third set of points is taken as an estimated GM region. The WMmean and WMstd are then estimated as a mean and a standard deviation of the intensity values of the second set of points, whereas GMmean and GMstd are estimated as a mean and a standard deviation of the intensity values of the third set of points.

Step 104: Optimize Initial Parameters

In step 104, a least squares fit algorithm is used to optimize (in other words, improve) the estimates of WMmean, WMstd, GMmean and GMstd.

Figure 4:
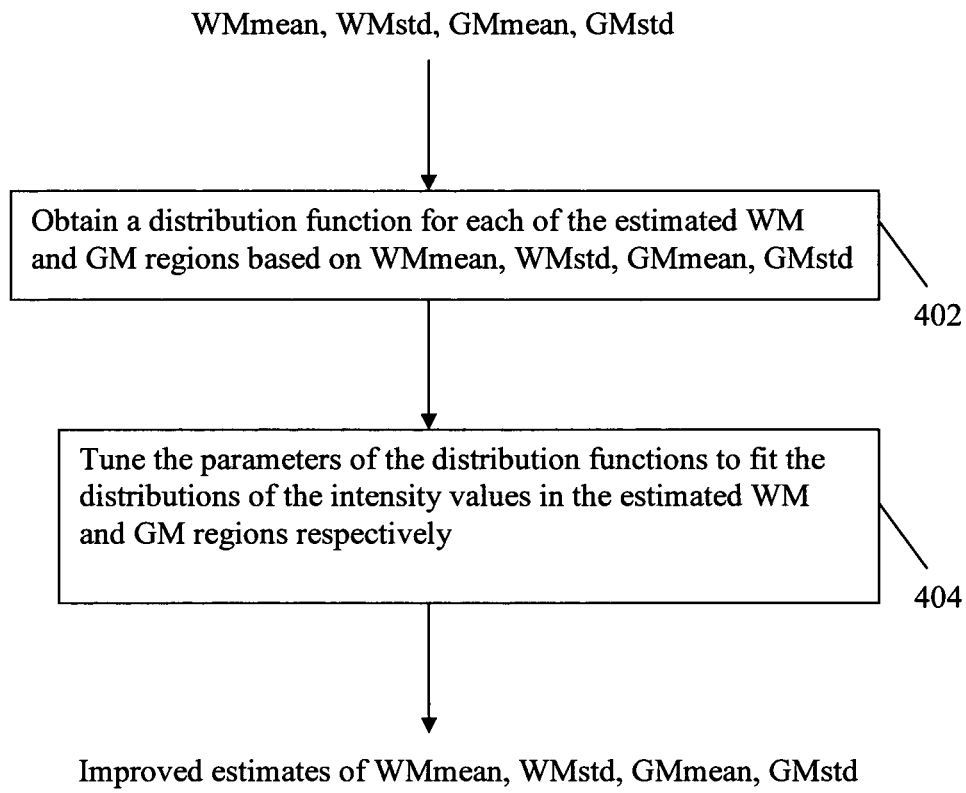
FIG. 4 illustrates a flow diagram of a step for optimizing initial parameters in the method of FIG. 1.

FIG. 4 illustrates the sub-steps of step 104. In sub-step 402, a distribution function is calculated for each of the estimated WM and GM regions based on WMmean, WMstd and GMmean, GMstd. This is done by setting the mean and standard deviation of the distribution function for the WM region as WMmean and WMstd respectively, and the mean and standard deviation of the distribution function for the GM region as GMmean and GMstd respectively. The distribution function may be any distribution as long as it is a function of a mean and a standard deviation. For example, the distribution function may be a Gaussian distribution or a lognormal distribution. In one example, the distribution function is a Gaussian distribution and is estimated by normalizing at the value of the respective mean (WMmean or GMmean). The advantage of using a Gaussian distribution is that this is one of the simplest functions available.

In sub-step 404, the statistical parameters (i.e. the mean and standard deviation) of the distribution functions for the WM and GM regions are varied locally to fit the distributions of the intensity values in the estimated WM and GM regions respectively as follows. In one example, the statistical parameters are varied within a tight range of ±5% of their initial values as set above. For example, if WMmean is 35, the mean of the distribution function for the WM region is varied between 33.25 to 36.75. Similarly, if WMstd or GMstd is 3, the standard deviations of the distribution functions for the WM and GM regions are varied between 2.85 to 3.15.

The final statistical parameters of the distribution function for the WM region are selected as the parameters which achieve a minimum sum of squared differences between the distribution function and the distribution of intensity values in the estimated WM region. In one example, the final statistical parameters are obtained using the least squares fitting algorithm in Matlab. To avoid spurious fits, the parameters are varied only locally in the tight range as mentioned above. WMmean and WMstd are then set as the final mean and standard deviation of the distribution function for the WM region. These are the improved estimates of WMmean and WMstd.

The same is performed for the GM region. The final statistical parameters of the distribution function for the GM region are selected as the parameters which achieve a minimum sum of squared differences between the distribution function and the distribution of the intensity values in the estimated GM region. In one example, the final statistical parameters are obtained using the least squares fitting algorithm in Matlab. GMmean and GMstd are then set as the final mean and standard deviation of the distribution function for the GM region. These are the improved estimates of GMmean and GMstd.

Figure 5:
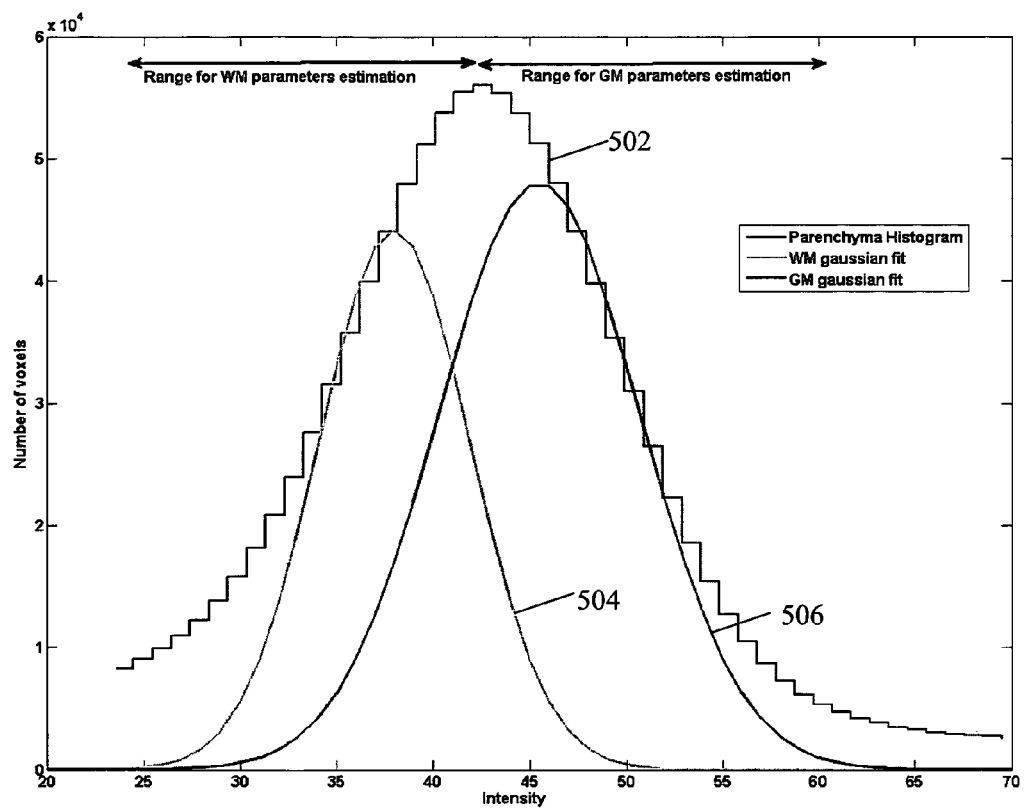
FIG. 5 illustrates example Gaussian distributions corresponding to white and gray matter regions.

FIG. 5 illustrates example Gaussian distributions corresponding to the white and gray matter regions. In FIG. 5, curves 502, 504 and 506 respectively plot the parenchyma histogram, an example Gaussian distribution corresponding to the white matter region (WM gaussian fit) and an example Gaussian distribution corresponding to the gray matter region (GM gaussian fit). Note that since in sub-step 404 the parameters of the distribution are varied within their local neighborhoods the result is very unlikely to be spurious Gaussian distributions (for example, a Gaussian distribution with a very broad standard deviation or a Gaussian distribution with a mean and standard deviation similar to the desired distribution but with a normalization different from the desired distribution (in this case, the Gaussian distribution with the larger normalization is likely to be the desired distribution).)

Step 106: Set Threshold Values Based on the Initial Parameters by Minimizing Overlap Regions In step 106, a lower threshold value and an upper threshold value are set for each of the CSF, WM and GM regions based on the initial parameters, CSFmean, CSFstd, WMmean, WMstd, GMmean, GMstd.

Firstly, the lower threshold value for the WM region is set as WMmean−1.96*WMstd whereas the upper threshold value for the GM region is set as GMmean+1.96*GMstd.

Figure 6:
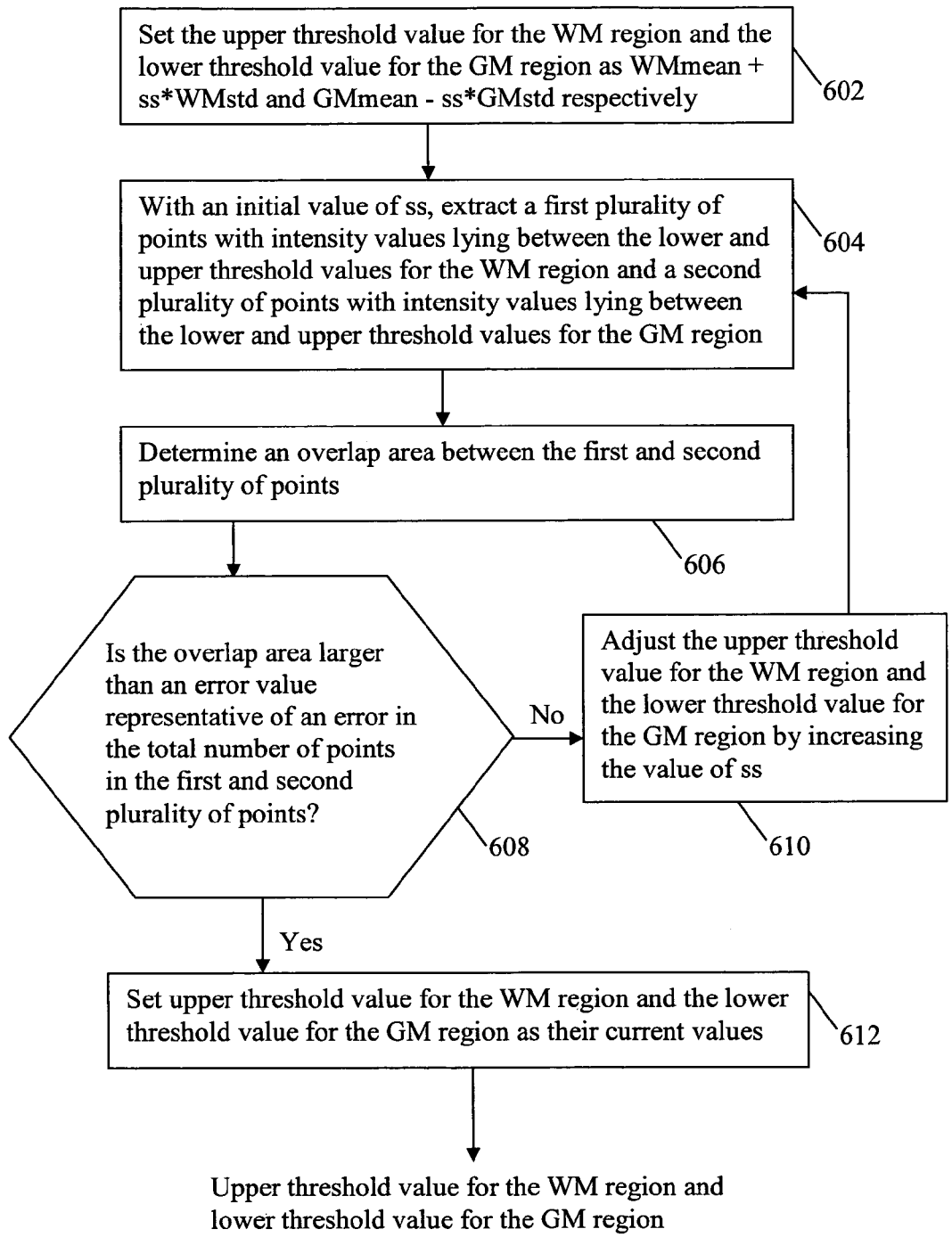
FIG. 6 illustrates a flow diagram of a step for setting threshold values in the method of FIG. 1.

FIG. 6 illustrates the sub-steps for setting the upper threshold value for the WM region and the lower threshold value for the GM region. These sub-steps aim to achieve a minimum overlap area between the estimated WM and GM regions.

In sub-step 602, the upper threshold value for the WM region and the lower threshold value for the GM region are first set as WMmean+ss*WMstd and GMmean−ss*GMstd respectively whereby ss is a variable.

In sub-step 604, with an initial value of ss, a first plurality of points with intensity values lying between the lower and upper threshold values for the WM region and a second plurality of points with intensity values lying between the lower and upper threshold values for the GM region are extracted from the image. The first and second plurality of points form trial WM and GM regions respectively. The initial value of ss may be set as a very small value, for example 0.5 and in this case, the overlap area is likely to be zero. In one example, a smoothing function is then applied to the first and second plurality of points.

In sub-step 606, an overlap area between the first and second plurality of points is determined whereby the overlap area is the number of points belonging to both the first and second plurality of points.

In sub-step 608, a check is then performed to determine if the overlap area is larger than an error value representative of an error in the total number of points in the first and second plurality of points. In one example, the error value is calculated as a function of $\sqrt{(AreaWM+AreaGM)}$ whereby AreaWM is the number of points in the first plurality of points and AreaGM is the number of points in the second plurality of points. The experimental results discussed below are obtained by setting the error value equal to $\sqrt{(AreaWM+AreaGM)}$.

If the check in sub-step 608 returns a positive result, the upper threshold value for the WM region and the lower threshold value for the GM region are set as their current values. If not, the upper threshold value for the WM region and the lower threshold value for the GM region are adjusted and sub-steps 604-608 are repeated until the check in sub-step 608 returns a positive result. In other words, ss is selected to be the value which maximizes the sizes of the trial WM and GM regions with the constraint that the overlap between them is bounded by the error value. The adjustment of the thresholds is performed by increasing the value of ss. In one example, the value of ss is increased in steps of 0.1.

A similar process can be used to obtain the cut-off between the CSF region and the WM region. As mentioned above, CSFmean and CSFstd estimates have been obtained, and these are used to derive a Gaussian function. We then derive a lower threshold value for the CSF region as CSFmean−1.96*CSFstd, and an upper threshold value for the CSF region as CSFmean+sscsf*CSFstd whereby sscsf is a variable. The lower threshold for the WM region is then redefined as WMmean−sscsf*WMstd. The following sub-steps 604a-608a similar to sub-steps 604-608 are then performed.

In sub-step 604a, with an initial value of sscsf, a third plurality of points with intensity values lying between the lower and upper threshold values for the CSF region and a fourth plurality of points with intensity values lying between the lower and upper threshold values for the WM region are extracted from the image. The third and fourth plurality of points form trial CSF and WM regions respectively. The initial value of sscsf may be set as a very small value, for example 0.5 and in this case, the overlap area is likely to be zero. In one example, a smoothing function is then applied to the third and fourth plurality of points.

In sub-step 606a, an overlap area between the third and fourth plurality of points is determined whereby the overlap area is the number of points belonging to both the third and fourth plurality of points.

In sub-step 608a, a check is then performed to determine if the overlap area is larger than an error value representative of an error in the total number of points in the third and fourth plurality of points. In one example, the error value is calculated as a function of $\sqrt{(AreaCSF+AreaWM)}$ whereby AreaCSF is the number of points in the third plurality of points and AreaWM is the number of points in the fourth plurality of points. The experimental results discussed below are obtained by setting the error value equal to $\sqrt{(AreaCSF+AreaWM)}$.

If the check in sub-step 608a returns a positive result, the upper threshold value for the CSF region and the lower threshold value for the WM region are set as their current values. If not, the upper threshold value for the CSF region and the lower threshold value for the WM region are adjusted and sub-steps 604a-608a are repeated until the check in sub-step 608a returns a positive result. In other words, sscsf is selected to be the value which maximizes the sizes of the trial CSF and WM regions with the constraint that the overlap between them is bounded by the error value. The adjustment of the thresholds is performed by increasing the value of sscsf. In one example, the value of sscsf is increased in steps of 0.1.

Step 108: Segment Image Using the Threshold Values

In step 108, the image is segmented using the threshold values obtained in step 106. In one example, an estimated CSF region, WM region and GM region comprising intensity values lying between the upper and lower threshold values for the CSF region, WM region and GM region respectively are extracted from the image.

Figure 7:
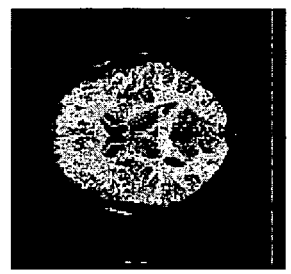
FIGS. 7(a)-(c) respectively illustrate initial estimated WM, GM and CSF regions in selected slices of an initial 3D segmented image obtained in the method of FIG. 1 and FIGS. 7(d)-7(f) respectively illustrate the estimated regions in FIGS. 7(a)-7(c) after a smoothing function is applied to these regions.
Figure 7:
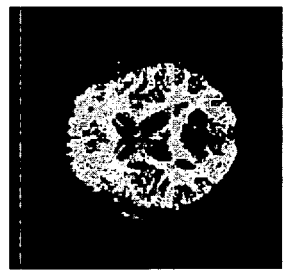
Figure 7:
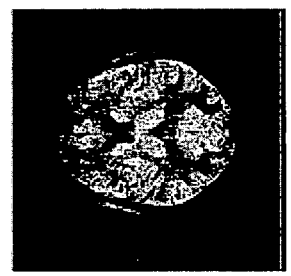
Figure 7:
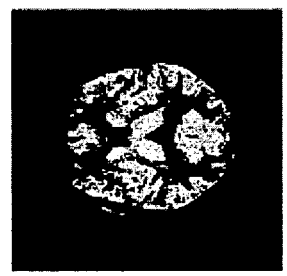
Figure 7:
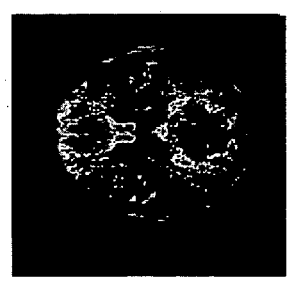
Figure 7:
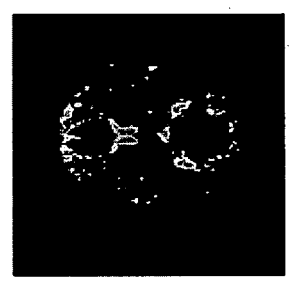

FIGS. 7(a)-7(c) respectively illustrate the initial estimated WM, GM and CSF regions in selected slices of the 3D segmented image obtained in step 108 whereas FIGS. 7(d)-7(f) respectively illustrate the estimated regions in FIGS. 7(a)-7(c) after a smoothing function is applied to these regions. The slices illustrated in FIGS. 7(a)-7(c) are axial slices selected at random from slices identified using domain knowledge regarding the distribution of CSF, WM, and GM in different planes.

Step 110: Remove Errors Due to Skull and Dura Mater

In step 110, a fourth range of intensity values is defined based on the lower threshold value for the CSF region and the upper threshold value for the GM region. In one example, the fourth range of intensity values is [CSFlower, GMupper] wherein CSFlower is the lower threshold value for the CSF region and GMupper is the upper threshold value for the GM region.

Figure 8:
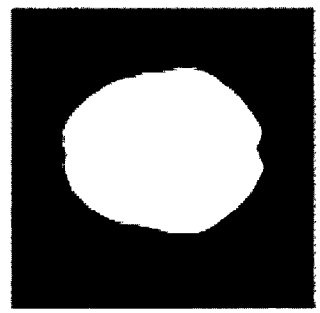
FIG. 8 illustrates an example of a mask obtained for removing errors due to skull and dura mater in the method of FIG. 1.

Next, a fourth set of points with intensity values lying within the fourth range is extracted from the image. Using the fourth set of points, a mask comprising non-zero values in an area within an inner skull boundary is created. In one example, the inner skull boundary is a boundary of a largest connected component formed by the fourth set of points in the image and the mask is created by filling the volume within the inner skull boundary with non-zero values. FIG. 8 illustrates an example of a mask obtained in step 110.

The mask is then applied to the estimated CSF, WM and GM regions to remove the errors due to the skull and dura matter. This forms updated CSF, WM and GM regions.

Figure 9:
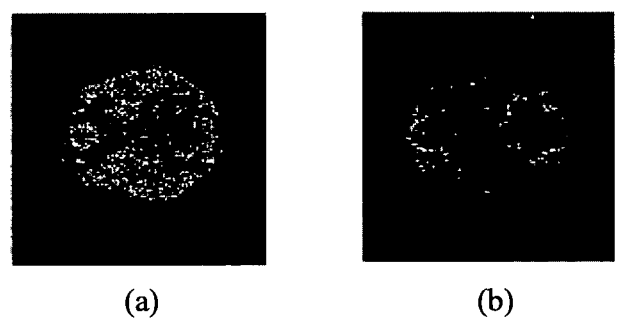
FIG. 9(a) illustrates the overlap regions between the initial estimated WM and GM regions in FIGS. 7(d) and 7(e) and FIG. 9(b) illustrates the overlap regions between the initial estimated WM and CSF regions in FIGS. 7(d) and 7(f)

Step 112: Resolve Overlap Regions Between the Estimated CSF and WM Regions and Between the Estimated WM and GM Regions In step 112, overlap regions between the estimated CSF and WM regions, and overlap regions between the estimated WM and GM regions are resolved. FIG. 9(a) illustrates the overlap regions between the estimated WM and GM regions in FIGS. 7(d) and 7(e) respectively whereas FIG. 9(b) illustrates the overlap regions between the estimated WM and CSF regions in FIGS. 7(d) and 7(f) respectively.

In step 112, a first set of overlap points belonging to both the estimated CSF and WM regions is extracted and a mean of the intensity values of the first set of overlap points is then calculated. For each overlap point in the first set, a check is then performed to determine if the intensity value of the overlap point is greater than the mean of the intensity values of the first set of overlap points. If so, the estimated WM region is updated to comprise the overlap point. If not, the estimated CSF region is updated to comprise the overlap point. This is because points with higher intensity values are more likely points in the WM region whereas points with lower intensity values are more likely points in the CSF region.

Similarly, a second set of overlap points belonging to both the estimated WM and GM regions is extracted and a mean of the intensity values of the second set of overlap points is then calculated. For each overlap point in the second set, a check is then performed to determine if the intensity value of the overlap point is greater than the mean of the intensity values of the second set of overlap points. If so, the estimated GM region is updated to comprise the overlap point. If not, the estimated WM region is updated to comprise the overlap point. This is because points with higher intensity values are more likely points in the GM region whereas points with lower intensity values are more likely points in the WM region.

In one example, a median filter is applied to the image prior to extracting the estimated CSF, WM and GM regions. A median filter with a narrow window (for example, [3,3]) may be used since the overlap regions are narrow.

There remain some unclassified points in the overlap regions i.e. points which do not belong to any of the estimated regions.

Step 114: Resolve Unclassified Points and Small Error Regions

Figure 10:
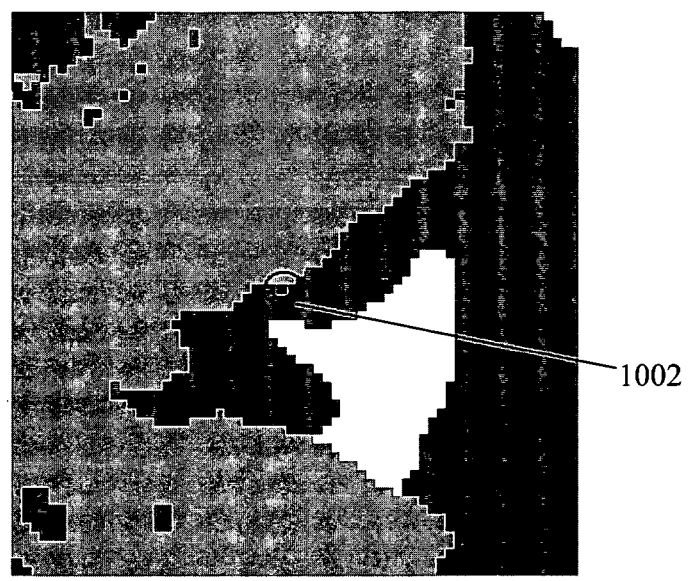
FIGS. 10(a) and 10(b) respectively illustrate example of unclassified points and small error regions in the image after obtaining the initial estimated WM, GM and CSF regions.
Figure 10:
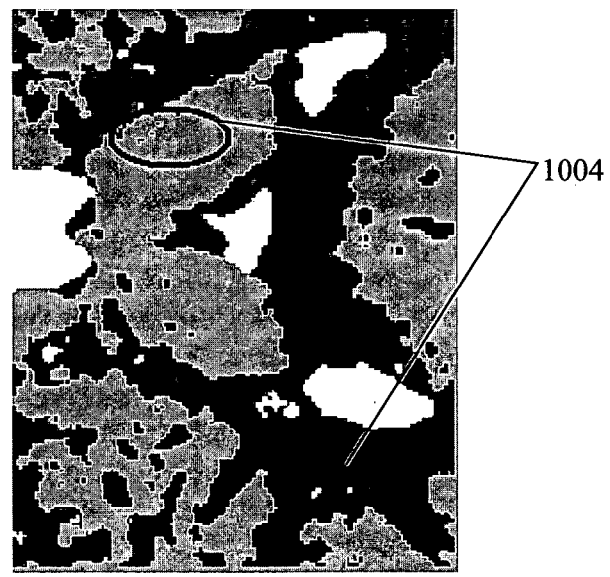

In step 114, a set of unclassified points which do not belong to any of the estimated regions is detected from the image and resolved via voting. Small error regions are also resolved via voting in step 114. FIGS. 10(a) and 10(b) illustrate examples of unclassified points 1002 and small error regions 1004 respectively.

The set of unclassified points is resolved as follows. For each unclassified point, it is determined which estimated region comprises a maximum number of votes, in other words, comprises the most number of points in a neighborhood region around the unclassified point. In one example, the neighborhood region is a square region. The estimated region comprising the maximum number of votes (i.e. a majority region) is then updated to comprise the unclassified point.

If no majority region is determined for an unclassified point (for example, due to a tie between two or more of the estimated regions or when all points in the neighborhood region are unclassified points), a size of the neighborhood region around the unclassified point is increased and this is repeatedly performed until a majority region for the unclassified point can be determined. Thus, the size of the largest neighborhood region in step 114 depends on the size of the largest region formed by the unclassified points in the image.

In one example, the detected set of unclassified points form regions of limited size in the image. The number of points in the regions of limited size is less than or equal to 0.01% of the number of points in a parenchyma region in the image (in one example, the number of points in the parenchyma region is estimated as the total number of points in the estimated CSF, WM and GM regions). This is because the unclassified points forming the larger regions in the image are more likely points in the vessels, calcification segments and sulci etc.

Points in small error regions are resolved in the same way as the unclassified points. In one example, small error regions are defined as regions having a number of points less than or equal to 0.01% of the number of points in a parenchyma region in the image.

Step 116: Identify and Resolve Further Error Regions Using Known Spatial Characteristics of Regions in the Image In step 116, known spatial distributions of points in the WM, GM and CSF regions in orthogonal planes (axial, coronal and/or sagittal plane) of typical brain images are used to identify the most (or the least probable tissue type) in a particular spatial location. This information is then used to reallocate error points in the estimated CSF, WM and GM regions.

(i) Spatial Distribution Probability of Points in GM, WM and CSF Regions

There is an observation that towards the brain skull boundary of the parenchyma region in a typical brain image, the probability that a point belongs to the CSF region or the GM region is much higher than the probability that the point belongs to the WM region e.g. see reference for distribution functions [14]. This observation is applied in step 116 to remove errors created due to the incorrect identification of the points in the "hyper-dense CSF regions" and the "hypo-dense GM regions" as points in the WM region of the cortical region.

In step 116, a first set of error points is extracted. The first set of error points are points which form small regions in the cortical region of the image and which belong to the estimated WM region. In one example, the small regions are defined as connected regions having a number of points less than a fraction (for example, 0.05%) of the number of points in a parenchyma region in the image. In one example, the number of points in the parenchyma region is estimated as the total number of points in the estimated CSF, WM and GM regions. These small regions are generally attached to the contour of the parenchyma region. The first set of error points may be located as follows. A perimeter of the brain is first determined in a slice of the image. The perimeter of the brain is then thickened by approximately 2 mm on each side. Next, small regions in the estimated WM region connected to the perimeter of the brain are located. The points in these small regions form the first set of error points.

Next, for each error point in the first set, a check is performed to determine if the intensity value of the error point is greater than WMmean and if so, the estimated GM region is updated to comprise the error point. If not, the estimated CSF region is updated to comprise the error point.

Figure 11:
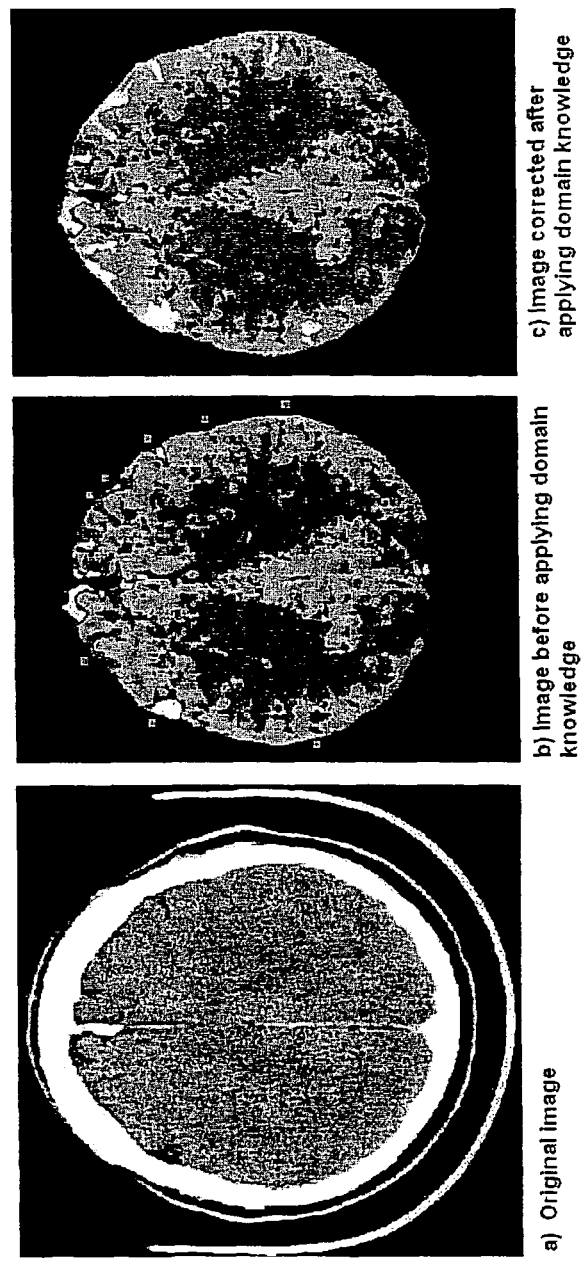
FIGS. 11(a)-(c) illustrate a correction of a set of error points in the initial estimated WM, GM and CSF regions.

FIGS. 11(*a*)-(*c*) illustrate the correction of the first set of error points. FIG. 11(*a*) illustrates a selected slice of the input image, FIG. 11(*b*) illustrates the estimated GM, WM and CSF regions with the first set of error points and FIG. 11(*c*) illustrates the estimated GM, WM and CSF regions with the first set of error points corrected.

(ii) Spatial Characteristics of Regions Above the Ventricular System

From the distribution of the intensity values of points in sagittal planes of typical brain images, it is observed that in regions above the ventricular system, the probability of a point near the Midsagittal plane (MSP) belonging to the WM region is much lower than the probability of the point belonging to either the GM region or the CSF region. This observation is applied in step 116 as follows.

Points in regions above the ventricular system in the image are extracted. The ventricular system is taken as a maximum connected region in the estimated CSF region. In one example, the image is filtered prior to extracting these points.

Next, a second set of error points is extracted. The second set of error points comprise the points in the regions above the ventricular system which belong to both the estimated WM region and regions connected to or in a vicinity of the MSP in the image. In one example, the regions connected to or in a vicinity of the MSP in the image are located as follows. The MSP is first located on a slice in the image (the MSP is a line on the slice). The MSP is then thickened by approximately 2 mm on each side. Regions connected to the MSP are then located and this helps to localize the small WM regions not connected to the MSP in the vicinity of the MSP. The number of points in each region connected to or in a vicinity of the MSP may be less than 0.05% of the number of points in the parenchyma region in the image. A point in a vicinity of the MSP is defined as a point which is at most 3 points away from the MSP.

For each error point in the second set, a check is performed to determine if the intensity value of the error point is greater than WMmean and if so, the estimated GM region is updated to comprise the error point. If not, the estimated CSF region is updated to comprise the error point.

(iii) Spatial Characteristics of WM Regions

In typical brain scans, it is observed that points in the WM region are connected in three-dimension. In other words, a small isolated group of points in three-dimension identified as points belonging to the WM region is most likely an error. This observation is applied in step 116 as follows.

A third set of error points belonging to the estimated WM region and forming small connected 3D regions in the image is extracted. In one example, a small connected 3D region is defined as a connected 3D region with a number of points less than 0.05% of the number of points in a parenchyma region in the image. In one example, the number of points in the parenchyma region is estimated as the total number of points in the estimated CSF, WM and GM regions.

For each error point in the third set, a check is performed to determine if the intensity value of the error point in the third set is greater than WMmean and if so, the estimated GM region is updated to comprise the error point. If not, the estimated CSF region is updated to comprise the error point.

Step 118: Obtain a Final Segmented Image

In step 118, a final segmented image is obtained by combining the estimated CSF, WM and GM regions.

Results

Figure 12:
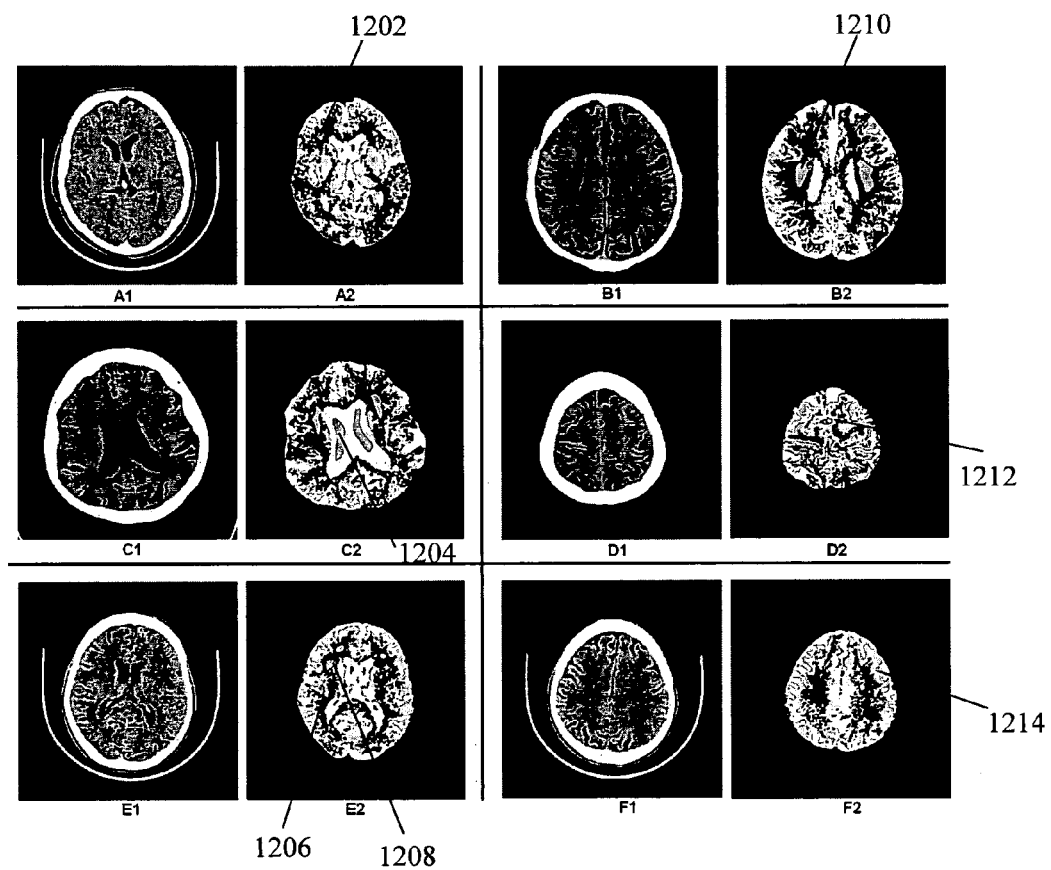
FIG. 12 illustrates the results produced by the method of FIG. 1 and the selection of different types of Ground Truth regions.

FIG. 12 illustrates the results obtained using method 100.

In FIG. 12, A1, B1, C1, D1, E1, F1 illustrate slices of the input brain images (these are the original unenhanced CT images) whereas A2, B2, C2, D2, E2, F2 illustrate the corresponding slices of the final segmented images obtained using method 100 overlaid with corresponding slices of ground truth images in which the locations of the CSF, WM and GM regions are marked by clinical experts. The slices illustrated in FIG. 12 are axial slices obtained at different levels in the axial plane of the brain image. These levels range from the inferior portion of the brain to the superior portion of the brain. Areas 1202, 1204, 1206, 1210, 1212 and 1214 are examples of correctly segmented areas whereas area 1208 is an example of an incorrectly segmented area. The results in FIG. 12 show that the number of correctly segmented areas is significantly higher than the number of incorrectly segmented areas.

Figure 13:
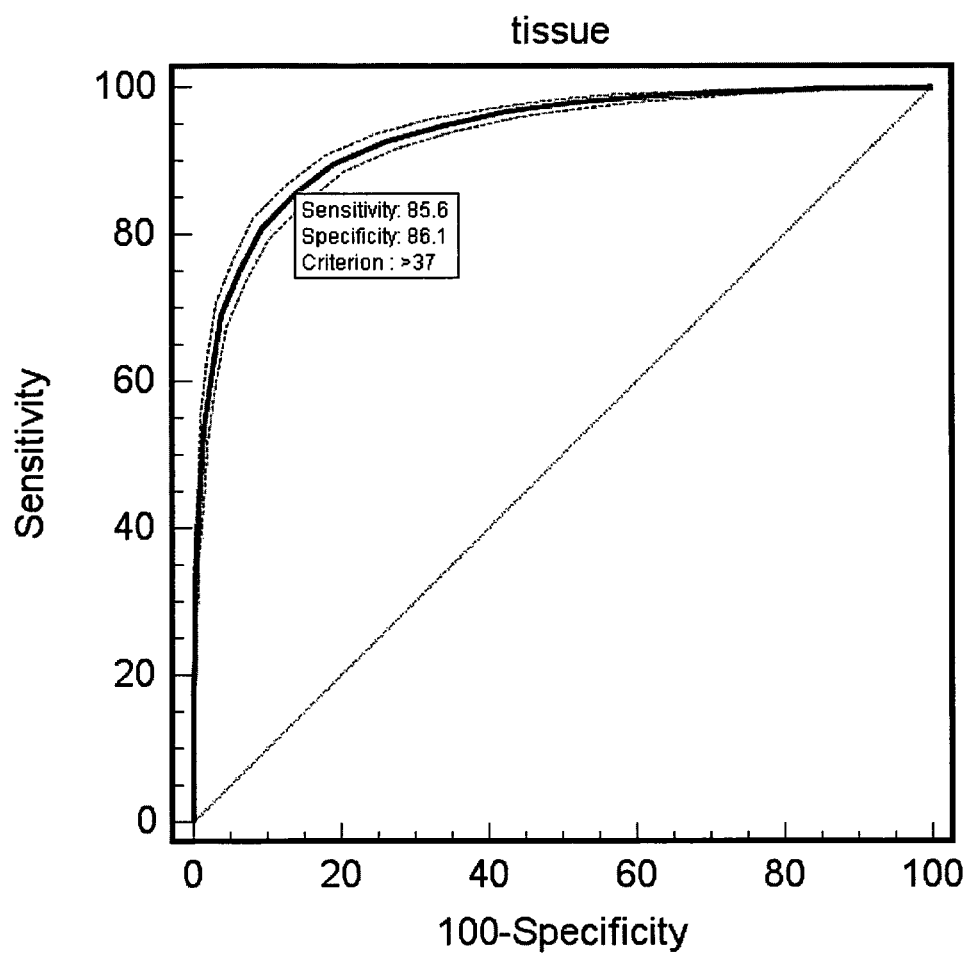
FIG. 13 illustrates a ROC curve obtained using ground truth GM and WM regions.

FIG. 13 illustrates a ROC curve obtained by evaluating the ground truth GM and WM regions against estimated GM and WM regions obtained using the intensity boundary (WMU). These estimated GM and WM regions comprise intensity values within the ranges [WMU, WMU+(WMU−CSFU)] and [CSFU, WMU] respectively. As shown in FIG. 13, choosing WMU to be near an intensity value corresponding to a peak of the parenchyma histogram (i.e. the histogram of the intensity values in the parenchyma region of the image) results in a sensitivity of 85.6 and a specificity of 86.1. In other words, the WMU chosen in this manner provides a good initial estimate of the boundary between the WM region and the GM region. Further fine tuning of this initial estimate is then performed in the subsequent steps as described above.

Figure 14:
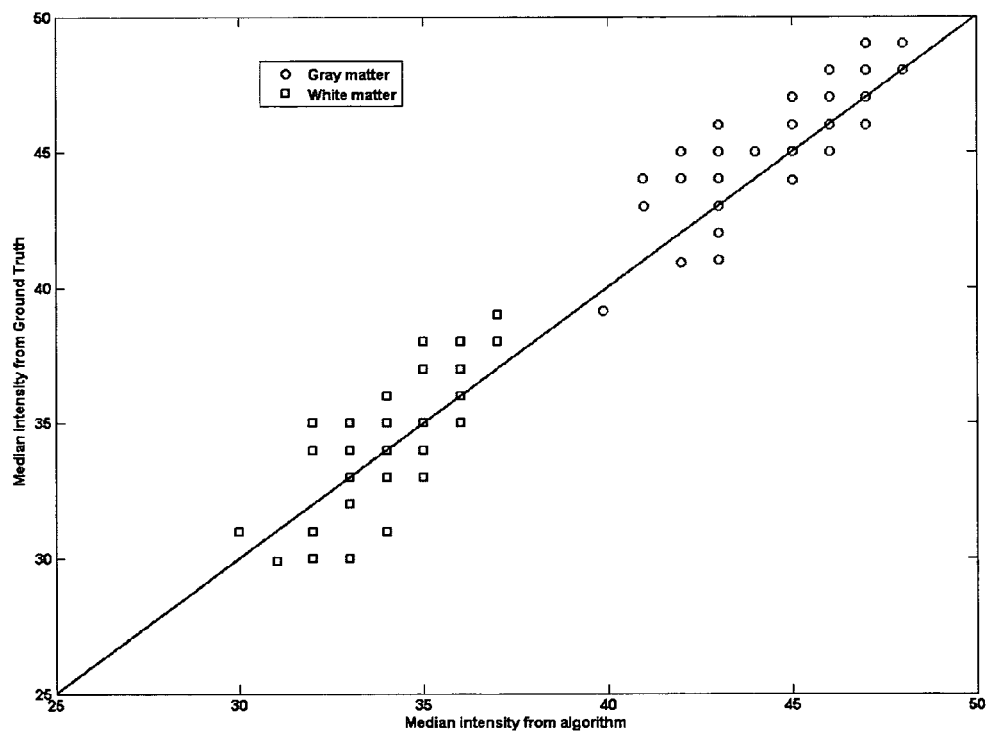
FIG. 14 illustrates a curve plotting median values of points in ground truth WM and GM regions against median values of points in the final estimated WM and GM regions obtained in the method of FIG. 1.

FIG. 14 illustrates a curve plotting the median values of the points in the ground truth WM and GM regions against the median values of the points in the estimated WM and GM regions from method 100. The square markers denote the points in the WM regions and the circle markers denote the points in the GM regions. As shown in FIG. 14, the median values of the points in the estimated regions from method 100 are approximately the same as the median values of the points in the ground truth regions.

The advantages of method 100 are as follows:

Method 100 uses an adaptive approach which combines intensity, spatial and statistical properties of the image to optimize parameters automatically whereby these parameters may be used in the setting of threshold values. Thus, method 100 does not require a user to set or adjust parameters. Neither does method 100 require the resetting of a large number of parameters (unlike, in level set algorithms). Furthermore, method 100 does not employ skull stripping steps, registration steps or a machine learning algorithm. Thus, method 100 is less prone to errors arising due to the need for multiple parameter adjustments, initial guesses or convergence criteria, registration, machine learning or skull stripping. This allows method 100 to be more robust to intensity variability and poor image contrast.

Method 100 calculates threshold values using the shapes of a plurality of histograms generated using intensity values in the image. Thus, it is robust to instrumentation parameters that may affect the image quality of the image.

Furthermore, spatial smoothing is performed in method 100, hence reducing the amount of overlap between the intensity distributions of different tissue regions. For example, spatial smoothing is performed in step 102, hence minimizing the contribution of intensity values in the WM region when calculating the estimated upper limit for the intensity values in the CSF region. Similarly, when estimating the threshold values to minimize the overlap area between the estimated WM and GM regions or between the estimated CSF and WM regions, spatial filtering is performed and this helps to remove error points so that the threshold values can be estimated from the less contaminated regions in the image.

In addition, in one example, method 100 only utilizes the histograms corresponding to certain tissue regions to estimate the upper limit for the intensity values in the CSF region (only the histograms of points in a largest connected component are generated in one example of step 102). Thus, the shapes of the histograms are mainly influenced by the intensity values in the CSF region and not the WM region.

Furthermore, in method 100, steps to reduce false positive and false negative errors (which may be caused by factors such as skull and dura mater, intensity distribution overlaps and unclassified points) are performed. This allows the method 100 to produce more accurate results. In method 100, having established the cores of the CSF, WM and GM regions, steps are performed to examine the boundaries of the estimated regions which may be predominant areas in which errors exist. For example, the higher intensity points in the boundaries are classified into the region known to have points of higher intensity values whereas the lower intensity points in the boundaries are classified into the region known to have points with lower intensity values. Furthermore, in method 100, the unclassified points and small error regions (i.e. small contaminated regions) in a particular tissue type are resolved through voting. The contaminations in the WM region are also resolved using known spatial characteristics of regions in the image. In method 100, if points in the estimated WM region form an isolated small region, they are considered points of a contamination region because it is expected that WM regions exist as large 3D connected regions.

Furthermore, method 100 is also versatile. It can be used to process input images of different image modalities. In addition, method 100 is tested using a median filter and an anisotropic diffusion filter [Perna and Malik] for performing its smoothing operations and it is shown that method 100 is robust to the type of filter used for the smoothing operations.

REFERENCES

1. Bevington P R (1969), Data Reduction and Error Analysis for the Physical Sciences, McGraw-Hill, Inc. pp 77.
2. Choi S P, Park H K, Park K N, Kim Y M, Ahn K J, Choi K H, Lee W J, Jeong S K (2008) The density ratio of grey to white matter on computed tomography as an early predictor of vegetative state or death after cardiac arrest. Emergency Medicine Journal, 25(10), 666-669.
3. DeLeo J M, Schwarz M, Creasy H, Cutler N, Rapoport S I (1985). Computer Assisted Categorization of Brain Computerized Tomography Pixels into Cerebrospinal Fluid, White Matter and Gray Matter. Computers and Biomedical Research 18, 79-88.
4. Hacker H and Artmann H. The Calculation of CSF Spaces in CT. Neuroradiology 16, 190-192 (1978).
5. Heydarian M, Noseworthy M D, Kamath M V, Boylan C, Poehlman W F S (2009). Optimizing the Level Set Algorithm for Detecting Object Edges in MR and CT images. IEEE Transactions on Nuclear Science, 56(1), 156-166.
6. Hu Y, Xie M (2007). Automatic Segmentation of Brain CT Image Based on Multiplicate Features and Decision Tree. International Conference on communications, circuits and systems proceedings 837-840.
7. Lee T H, Fauzi M F A, Komiya R (2008). Segmentation of CT Brian Images Using K-means and EM clustering. Computer Graphics, Imaging and visualization-Modern Techniques and Applications, Proceedings, 339-344.
8. Maksimovic R, Stankovic S, Milovanovic D (2000). Computed tomography image analyzer: 3D reconstruction and segmentation applying active contour models-'snakes'. International Journal of medical Informatics. 58-59:29-37.
9. Mandel J (1984). The Statistical analysis of experimental data, Courier Dover Publications, page 72.
10. Maulik U (2009). Medical Image Segmentation Using Genetic Algorithms. IEEE transaction of information technology in biomedicine, 13(2), 166-173.
11. Qian G Y, Luo S H, Jlnl J, Park M, Nowinski W L (2007). Extraction of the brain from CT head scans based on domain knowledge. Computational models for life sciences. AIP conference proceedings, 952, 76-85.
12. Ruttimann U E, Joyce E M, Rio D E, Eckardt M J (1993). Fully Automated Segmentation of Cerebrospinal Fluid in Computed Tomography. Psychiatry Research: Neuroimaging, 50:101-119.
13. Torbey M T, Selim M, Knorr J, Bigelow C, Recht L (2000). Quantitative Analysis of the Loss of Distinction Between Gray and White Matter in Comatose Patients After Cardiac Arrest. Stroke 31:2163-2167.
14. Nowinski W L, Gupta V, Wai Yen Chan, Y Y Sitoh, Kang Sim. Use of a local gray to white matter relationship to study the brain in health and disease. Submitted to Academic Radiology.

What is claimed is:

1. A method for segmenting a brain image into a plurality of regions comprising at least a cerebrospinal fluid (CSF) region, wherein the brain image comprises intensity values at respective points and wherein the method comprises the operations of:
    (a) defining an initial intensity range;
    (b) extracting from the image a plurality of points with intensity values within the intensity range;
    (c) identifying a subset of the extracted points forming a spatially connected region of a maximum size;
    (d) generating a histogram of the intensity values of the subset of the extracted points;
    (e) obtaining a significance parameter characterizing the generated histogram;
    (f) at least once varying the intensity range and repeating operations (b)-(e) to maximize the value of the significance parameter;
    (g) estimating a limit for the intensity values in the CSF region as an end of the varied intensity range; and (h) using the estimated limit for the intensity values in the CSF region in a process of segmenting the image.

2. A method according to claim 1, wherein operation (b) further comprises the sub-operation of applying a smoothing function to the extracted points.

3. A method according to claim 1, wherein operation (d) further comprises the sub-operation of applying a smoothing function to the generated histogram.

4. A method according to claim 1, wherein the significance parameter is indicative of a difference between a maximum frequency in the generated histogram and a frequency with which a maximum intensity value in the generated histogram occurs.

5. A method according to claim 4, wherein the significance parameter is calculated as $(Hmax-Hend)/\sqrt{(Hmax+Hend)}$ wherein Hmax is the maximum frequency in the generated histogram and Hend is the frequency with which the maximum intensity value in the generated histogram occurs.

6. A method according to claim 1, wherein operation (h) comprises estimating a mean and a standard deviation of the intensity values in an estimated CSF region obtained using the estimated limit.

7. A method according to claim 1 in which operation (h) further comprises:
obtaining a second histogram of the intensity values of the points in the brain image for which the intensity value is above the estimated limit;
from the second histogram obtaining an intensity boundary; and
using the intensity boundary to partition the points in the brain image for which the intensity value is above the estimated limit into estimated white matter (WM) and gray matter (GM) regions.

8. A method according to claim 7 in which the intensity boundary is an intensity value with a maximum frequency in the second histogram.

9. A method according to claim 7 further comprising:
using the intensity values of the points in the estimated WM and GM regions to obtain estimated statistical parameters characterizing the distributions of the intensity values in the estimated WM and GM regions, and
using the statistical parameters to improve the estimated WM and GM regions.

10. A method according to claim 9 comprising deriving distribution functions using the estimated statistical parameters, and improving the statistical parameters by fitting the distribution functions to the intensity values of the points in the estimated WM and GM regions.

11. A method according to claim 9 in which the sub-operation of using the statistical parameters to improve the estimated WM and GM regions using the statistical parameters comprises:
defining trial WM and GM regions based on the statistical parameters and a variable ss;
selecting the variable ss to be the value which maximizes the sizes of the trial WM and GM regions with the constraint that the overlap between them is bounded by an error value.

12. A method according to claim 11, wherein the error value is calculated as a function of $\sqrt{(AreaWM+AreaGM)}$ whereby AreaWM is the number of points in the trial WM region and AreaGM is the number of points in the trial GM region.

13. A method according to claim 7, further comprising the operations of:
creating a mask comprising non-zero values in an area within an inner skull boundary; and
applying the mask to each of the estimated CSF, WM and GM regions.

14. A method according to claim 13, wherein the inner skull boundary is a boundary of a largest connected component of a set of points of the brain image having respective intensities within a selected range of intensity values.

15. A method according to claim 7, further comprising the operations of:
locating a first set of overlap points belonging to both the estimated CSF and WM regions;
calculating a mean of the intensity values of the first set of overlap points; and
for each overlap point in the first set, checking if the intensity value of the overlap point is greater than the mean of the intensity values of the first set of overlap points; if not, updating the estimated CSF region to comprise the overlap point; and if so, updating the estimated WM region to comprise the overlap point.

16. A method according to claim 15, wherein the method further comprises an operation of applying a median filter to the image prior to extracting the estimated CSF, WM and GM regions from the image.

17. A method according to claim 7, further comprising the operations of:
locating a second set of overlap points belonging to both the estimated WM and GM regions;
calculating a mean of the intensity values of the second set of overlap points; and
for each overlap point in the second set, checking if the intensity value of the overlap point is greater than the mean of the intensity values of the second set of overlap points; if not, updating the estimated WM region to comprise the overlap point; and if so, updating the estimated GM region to comprise the overlap point.

18. A method according to claim 7, the method further comprising the operations of:
detecting a set of unclassified points which do not belong to any of the estimated regions;
for each unclassified point in the set, determining which of the estimated regions is a majority region comprising a most number of points in a neighbourhood region around the unclassified point and updating the majority region to comprise the unclassified point.

19. A method according to claim 18, wherein the neighbourhood region around the unclassified point is a square region.

20. A method according to claim 18, wherein if no majority region is determined for an unclassified point, a size of the neighbourhood region around the unclassified point is repeatedly increased until a majority region for the unclassified point is determined.

21. A method according to claim 18, wherein a number of points in regions formed by the set of unclassified points is less than or equal to 0.01% of a number of points in a parenchyma region in the image.

22. A method according to claim 7, the method further comprising the operations of:
detecting a first set of error points, the first set of error points belonging to the estimated WM region and forming small regions in a cortical region in the image wherein a number of points in each small region is less than a fraction of a number of points in a parenchyma region in the image; and
for each error point in the first set, checking if the intensity value of the error point is greater than an estimated mean of the intensity values in the WM region; if so, updating the estimated GM region to comprise the error point; and if not, updating the estimated CSF region to comprise the error point.

23. A method according to claim 7, the method further comprising the operations of:
extracting points in regions above a ventricular system in the image;
extracting a second set of error points, the second set of error points comprising points in the regions above the ventricular system belonging to both the estimated WM region and regions connected to or within a predetermined distance from a midsagittal plane in the image; and
for each error point in the second set, checking if the intensity value of the error point is greater than an estimated mean of the intensity values in the WM region; if so, updating the estimated GM region to comprise the error point; and if not, updating the estimated CSF region to comprise the error point.

24. A method according to claim 23, wherein the ventricular system in the image is a maximum connected region in the estimated CSF region.

25. A method according to claim 23, wherein the image is filtered prior to the operation of extracting points in regions above the ventricular system.

26. A method according to claim 7, the method further comprising the operations of:
extracting a third set of error points, the third set of error points belonging to the estimated second region and forming small connected 3D regions in the image wherein a number of points in each small connected 3D region is less than 0.05% of a number of points in a parenchyma region in the image; and
for each error point in the third set, checking if the intensity value of the error point is greater than an estimated mean of the intensity values in the WM region; if so, updating the estimated GM region to comprise the error point; and if not, updating the estimated CSF region to comprise the error point.

27. A computer system having a processor and a memory device, the memory device storing program instructions operative, upon implementation by the processor, to segment a brain image, which comprises intensity values at respective points, into a plurality of regions comprising at least a cerebrospinal fluid (CSF) region, by:
 (a) defining an initial intensity range;
 (b) extracting from the image a plurality of points with intensity values within the intensity range;
 (c) identifying a subset of the extracted points forming a spatially connected region of a maximum size;
 (d) generating a histogram of the intensity values of the subset of the extracted points;
 (e) obtaining a significance parameter characterizing the generated histogram;
 (f) at least once varying the intensity range and repeating operations (b)-(e) to maximize the value of the significance parameter;
 (g) estimating a limit for the intensity values in the CSF region as an end of the varied intensity range; and
 (h) using the estimated limit for the intensity values in the CSF region in a process of segmenting the image.

28. A tangible non-transitory data storage device, readable by a computer and containing instructions operable by a processor of a computer system to cause the processor to segment a brain image, which comprises intensity values at respective points, into a plurality of regions comprising at least a cerebrospinal fluid (CSF) region, by:
 (a) defining an initial intensity range;
 (b) extracting from the image a plurality of points with intensity values within the intensity range;
 (c) identifying a subset of the extracted points forming a spatially connected region of a maximum size;
 (d) generating a histogram of the intensity values of the subset of the extracted points;
 (e) obtaining a significance parameter characterizing the generated histogram;
 (f) at least once varying the intensity range and repeating operations (b)-(e) to maximize the value of the significance parameter;
 (g) estimating a limit for the intensity values in the CSF region as an end of the varied intensity range; and
 (h) using the estimated limit for the intensity values in the CSF region in a process of segmenting the image.

* * * * *